(12) United States Patent
Medinei et al.

(10) Patent No.: US 10,807,584 B2
(45) Date of Patent: Oct. 20, 2020

(54) METHODS AND SYSTEMS FOR BRAKE PAD LIFE DETERMINATION

(71) Applicant: GM GLOBAL TECHNOLOGY OPERATIONS LLC, Detroit, MI (US)

(72) Inventors: Nojan Medinei, Toronto (CA); Stacey M. Marmara, Markham (CA); Hung H. Nguyen, Toronto (CA); Paul S. Shaub, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 290 days.

(21) Appl. No.: 16/020,103

(22) Filed: Jun. 27, 2018

(65) Prior Publication Data
US 2020/0001849 A1 Jan. 2, 2020

(51) Int. Cl.
*B60T 17/22* (2006.01)
(52) U.S. Cl.
CPC ......... *B60T 17/221* (2013.01); *B60T 2210/14* (2013.01); *B60T 2240/00* (2013.01); *B60T 2250/00* (2013.01)

(58) Field of Classification Search
CPC ............... B60T 17/221; B60T 2210/14; B60T 2240/00; B60T 2250/00
See application file for complete search history.

(56) References Cited

U.S. PATENT DOCUMENTS

2017/0276199 A1* 9/2017 Yabusaki ............. B60T 17/221

* cited by examiner

*Primary Examiner* — Michael D Lang
(74) *Attorney, Agent, or Firm* — Quinn IP Law (57) ABSTRACT

An exemplary method for performing a brake pad life determination includes providing a brake assembly, including a brake pad position sensor, providing a control system comprising a controller electronically connected to the brake assembly, receiving sensor position data from the brake pad position sensor, determining whether the sensor position data satisfies a first acceptance criterion, if the sensor position data satisfies the first acceptance criterion, performing statistical analysis of the sensor position data to determine a standard deviation and a mean of the sensor position data, determining whether the sensor position data satisfies a second acceptance criterion, and if the sensor position data satisfies the second acceptance criterion, determining a brake pad life estimate.

18 Claims, 4 Drawing Sheets

METHODS AND SYSTEMS FOR BRAKE PAD LIFE DETERMINATION

INTRODUCTION

The present invention relates generally to the field of vehicles and, more specifically, to a brake pad life determination system and method.

Vehicles, such as cars, include disc brakes for slowing the rotation of a wheel or another driven component. A disc brake may include a brake pad, a brake caliper, and a brake disc, which is also known as a rotor. The brake disc is operatively connected to the wheel, and the brake caliper is operatively coupled to the brake pad. During operation, the brake caliper can press the brake pad against the brake disc. As a consequence, the friction between the brake pad and the brake disc causes the brake disc (and the wheel attached to the brake disc) to slow or stop.

SUMMARY

Because the brake pad is subjected to friction during use, the brake pad may wear over time. It is therefore useful to monitor the wear of the brake pad in order to determine when the brake pad is about to reach the end of its life (i.e., when the brake bad should be replaced). Current estimation methods of the remaining brake pad lining life (thickness) rely on physical sensors that wear with the linings, providing feedback of their status. A strategy to include sensor position inputs, brake knockback detection, absolute initial sensor position, and relative deviation determination to determine brake pad thickness is disclosed herein. Also, in some embodiments, intelligent methods may also be used to automatically learn the threshold for acceptance of sensor data.

Embodiments according to the present disclosure provide a number of advantages. For example, embodiments according to the present disclosure provide methods to determine a brake pad life estimate based on data provided from a wireless sensor evaluated along with sensor position, brake knockback detection, initial sensor position, and relative deviation information.

In one aspect, a method for performing a brake pad life determination is disclosed. The method includes providing a brake assembly, including a brake pad position sensor, providing a control system includes a controller electronically connected to the brake assembly, receiving, by the controller, sensor position data from the brake pad position sensor, determining, by the controller, whether the sensor position data satisfies a first acceptance criterion, if the sensor position data satisfies the first acceptance criterion, performing, by the controller, statistical analysis of the sensor position data to determine a standard deviation and a mean of the sensor position data, determining, by the controller, whether the sensor position data satisfies a second acceptance criterion, and if the sensor position data satisfies the second acceptance criterion, determining, by the controller, a brake pad life estimate.

In some aspects, the method further includes providing a vehicle sensor configured to measure a vehicle lateral acceleration, and wherein determining whether the sensor position data satisfies the first acceptance criterion includes determining whether the vehicle lateral acceleration data is less than a maximum lateral acceleration threshold.

In some aspects, the method further includes providing a vehicle sensor configured to measure a vehicle wheel speed, and wherein determining whether the sensor position data satisfies the first acceptance criterion includes determining whether the vehicle wheel speed data is not indicative of a rough road condition.

In some aspects, determining whether the sensor position data satisfies a second acceptance criterion includes comparing an input sensor data point to the standard deviation and the mean of the sensor position data.

In some aspects, comparing the input sensor data point to the standard deviation and the mean of the sensor position data includes determining if the input sensor data point satisfies a first equation $|\text{Input Point}-\mu_{Batch}| \leq \alpha \sigma_{Batch}$ where $\mu_{Batch}$ is the mean of the sensor position data, $\sigma_{Batch}$ is the standard deviation of the sensor position data, and $\alpha$ is a calibratable coefficient, and if the input sensor data point satisfies the first equation, using the input sensor data point to determine a sensor position deviation.

In some aspects, comparing the input sensor data point to the standard deviation and the mean of the sensor position data includes determining if the input sensor data point satisfies a first equation $|\text{Input Point}-\mu_{Batch}| > \alpha \sigma_{Batch}$ and a second equation $|\text{Input Point}-\mu_{Batch}| \leq \beta \sigma_{Batch}$ where $\mu_{Batch}$ is the mean of the sensor position data, $\sigma_{Batch}$ is the standard deviation of the sensor position data, and $\alpha$ and $\beta$ are calibratable coefficients, and, if the input sensor data point satisfies the first and second equations, rejecting the input sensor data point.

In some aspects, comparing the input sensor data point to the standard deviation and the mean of the sensor position data includes determining if the input sensor data point satisfies a first equation $|\text{Input Point}-\mu_{Batch}| > \text{Cal Threshold}$ where $\mu_{Batch}$ is the mean of the sensor position data and Cal Threshold is a calibratable threshold for a deviation of the input point from the mean of the sensor position data, and if the input sensor data point satisfies the first equation, using the input sensor data point to determine a brake pad replacement estimate.

In another aspect, a method for performing a brake pad life determination is disclosed. The method includes providing a brake assembly, including a brake pad position sensor, providing a vehicle sensor configured to measure a vehicle characteristic, providing a control system including a controller electronically connected to the brake assembly and the vehicle sensor, receiving, by the controller, sensor position data from the brake pad position sensor, determining, by the controller, whether the sensor position data satisfies a first acceptance criterion, if the sensor position data satisfies the first acceptance criterion, performing, by the controller, statistical analysis of the sensor position data to determine a standard deviation and a mean of the sensor position data, determining, by the controller, whether the sensor position data satisfies a second acceptance criterion, and if the sensor position data satisfies the second acceptance criterion, determining, by the controller, a brake pad life estimate.

In some aspects, the vehicle sensor is a vehicle wheel speed sensor and the vehicle characteristic is a vehicle wheel speed.

In some aspects, the method further includes determining a knockback condition from the vehicle wheel speed sensor data.

In some aspects, if a knockback condition is indicated, the method further includes rejecting the sensor position data until a second vehicle operating condition is detected.

In some aspects, the second vehicle operating condition is a vehicle brake application.

In some aspects, determining whether the sensor position data satisfies the first acceptance criterion includes determining whether the vehicle wheel speed sensor data indicates a knockback condition of the brake pad position sensor and if a knockback condition is indicated, rejecting the sensor position data.

In some aspects, the vehicle sensor is a lateral acceleration sensor, the vehicle characteristic is a vehicle lateral acceleration, and wherein determining whether the sensor position data satisfies the first acceptance criterion includes determining whether the vehicle lateral acceleration data is less than a maximum lateral acceleration threshold.

In some aspects, determining whether the sensor position data satisfies a second acceptance criterion includes comparing an input sensor data point to the standard deviation and the mean of the sensor position data such that if the input sensor data point satisfies a first equation |Input Point−$\mu_{Batch}$|≤$\alpha\sigma_{Batch}$ where $\mu_{Batch}$ is the mean of the sensor position data, $\sigma_{Batch}$ is the standard deviation of the sensor position data, and $\alpha$ is a calibratable coefficient, the method further includes using the input sensor data point to determine a sensor position deviation, and if the input sensor data point satisfies a second equation |Input Point−$\mu_{Batch}$|>Cal Threshold where $\mu_{Batch}$ is the mean of the sensor position data and Cal Threshold is a calibratable threshold for a deviation of the input point from the mean of the sensor position data, the method further includes using the input sensor data point to determine a brake pad replacement estimate.

In yet another aspect, a method for performing a brake pad life determination is disclosed. The method includes providing a brake assembly, including a brake pad position sensor, providing a vehicle sensor configured to measure a vehicle characteristic, providing a control system including a controller electronically connected to the brake assembly and the vehicle sensor, receiving, by the controller, sensor position data from the brake pad position sensor, determining, by the controller, whether the sensor position data satisfies a first acceptance criterion, wherein the first acceptance criterion is satisfied if a knockback condition is not detected. If the sensor position data satisfies the first acceptance criterion, the method includes performing, by the controller, statistical analysis of the sensor position data to determine a standard deviation and a mean of the sensor position data, comparing an input sensor data point to the standard deviation and the mean of the sensor position data to determine if the input sensor data point satisfies a first equation |Input Point−$\mu_{Batch}$|≤$\alpha\sigma_{Batch}$ where $\mu_{Batch}$ is the mean of the sensor position data, $\sigma_{Batch}$ is the standard deviation of the sensor position data, and $\alpha$ is a calibratable coefficient, and if the input sensor data point satisfies the first equation, using the input sensor data point to determine a sensor position deviation. The method includes comparing the input sensor data point to the standard deviation and the mean of the sensor position data to determine if the input sensor data point satisfies a second equation |Input Point−$\mu_{Batch}$|>$\alpha\sigma_{Batch}$ and a third equation |Input Point−$\mu_{Batch}$|≤$\beta\sigma_{Batch}$ where $\mu_{Batch}$ is the mean of the sensor position data, $\sigma_{Batch}$ is the standard deviation of the sensor position data, and $\alpha$ and $\beta$ are calibratable coefficients, and, if the input sensor data point satisfies the second and third equations, rejecting the input sensor data point, and if the input sensor data point satisfies a fourth equation |Input Point−$\mu_{Batch}$|>Cal Threshold where $\mu_{Batch}$ is the mean of the sensor position data and Cal Threshold is a calibratable threshold for a deviation of the input point from the mean of the sensor position data, and, if the input sensor data point satisfies the fourth equation, using the input sensor data point to determine a brake pad replacement estimate.

In some aspects, the vehicle sensor is a vehicle wheel speed sensor, the vehicle characteristic is a vehicle wheel speed, and the method further includes determining a knockback condition from the vehicle wheel speed sensor data.

In some aspects, the vehicle sensor is a lateral acceleration sensor, the vehicle characteristic is a vehicle lateral acceleration, and the method further includes determining a knockback condition by determining whether the vehicle lateral acceleration data is greater than a maximum lateral acceleration threshold.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
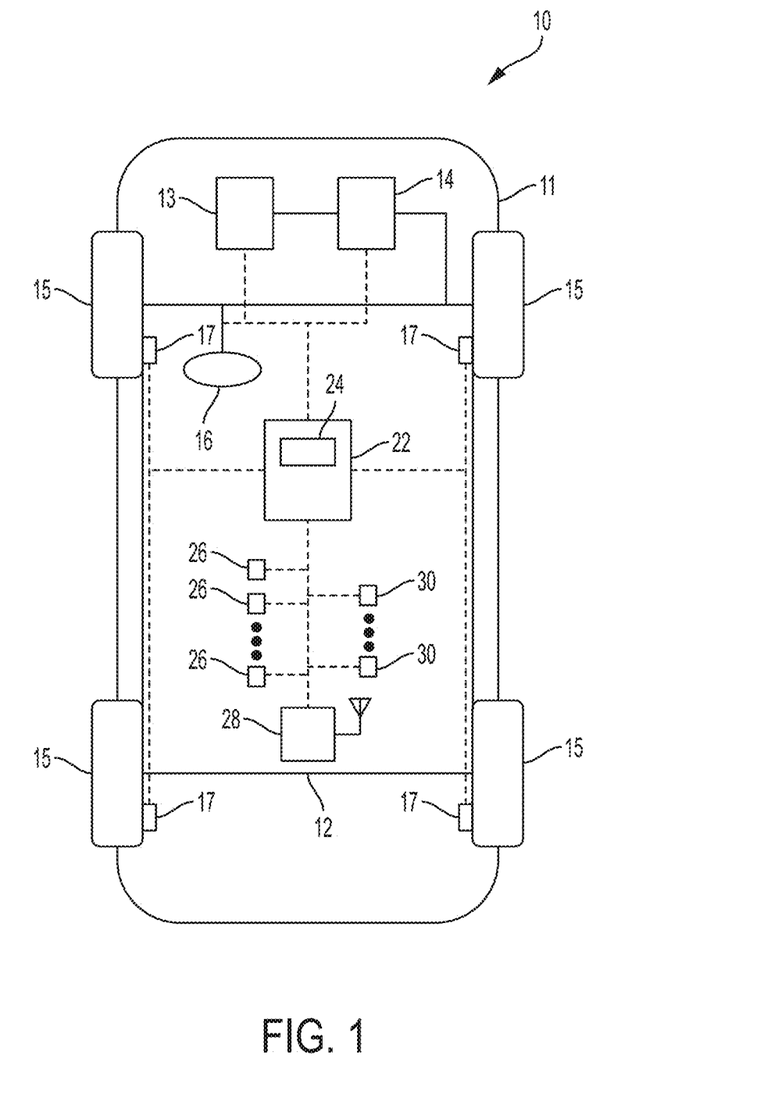
FIG. 1 is a schematic diagram of a vehicle, according to an embodiment.

FIG. 1 schematically illustrates an automotive vehicle 10 according to the present disclosure. The vehicle 10 generally includes a body 11, a chassis 12, and wheels 15. The body 11 is arranged on the chassis 12 and substantially encloses the other components of the vehicle 10. The body 11 and chassis 12 may jointly form a frame. The wheels 15 are each rotationally coupled to the chassis 12 near a respective corner of the body 11. The vehicle 10 is depicted in the illustrated embodiment as a passenger car, but it should be appreciated that any other vehicle including motorcycles, trucks, sport utility vehicles (SUVs), or recreational vehicles (RVs), etc., can also be used.

The vehicle 10 includes a propulsion system 13, which may in various embodiments include an internal combustion engine, an electric machine such as a traction motor, and/or a fuel cell propulsion system. The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission. The vehicle 10 additionally includes a brake assembly 17 configured to provide braking torque to the vehicle wheels 15. The brake assembly 17 may, in various embodiments, include friction brakes, a regenerative braking system such as an electric machine, and/or other appropriate braking systems. In some embodiments, the brake assembly 17 is an electromechanical brake assembly that includes at least one brake pad, a brake caliper, a brake rotor, a brake pad position sensor, and a drive unit.

The vehicle 10 additionally includes a steering system 16. In various embodiments, the vehicle 10 also includes a wireless communication system 28. In some embodiments, the wireless communication system 28 includes a navigation system configured to provide location information in the form of GPS coordinates (longitude, latitude, and altitude/elevation) to a controller 22. In some embodiments, the wireless communication system 28 may include a Global Navigation Satellite System (GNSS) configured to communicate with global navigation satellites to provide autonomous geo-spatial positioning of the vehicle 10. In the illustrated embodiment, the wireless communication system 28 includes an antenna electrically connected to a receiver.

With further reference to FIG. 1, the vehicle 10 also includes a sensing system including a plurality of sensors 26 configured to measure and capture data on one or more vehicle characteristics, including but not limited to vehicle speed, vehicle lateral acceleration, vehicle wheel speed, brake pedal travel, brake pedal depression frequency, brake pad thickness, etc. In the illustrated embodiment, the sensors 26 include, but are not limited to, an accelerometer, a speed sensor, a heading sensor, a position sensor, or other sensors that sense observable conditions of the vehicle or the environment surrounding the vehicle and may include RADAR, LIDAR, optical cameras, thermal cameras, ultrasonic sensors, and/or additional sensors as appropriate. The plurality of sensors 26 may be wired or wirelessly connected to a stand-alone controller, a vehicle electronic control unit (ECU), a brake system control unit, a vehicle inertial measurement unit, or any other controller located in or in communication with the vehicle 10. The vehicle 10 also includes a plurality of actuators 30 configured to receive control commands to control steering, shifting, throttle, braking, or other aspects of the vehicle 10, as discussed in greater detail below.

The vehicle 10 includes at least one controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle, including the brake assembly 17. In various embodiments, the vehicle 10 is an autonomous or semi-autonomous vehicle in which one or more aspects of the vehicle, including vehicle braking, are controlled by the controller 22. In various embodiments, the vehicle 10 is directly operated by a vehicle operator.

Figure 2:
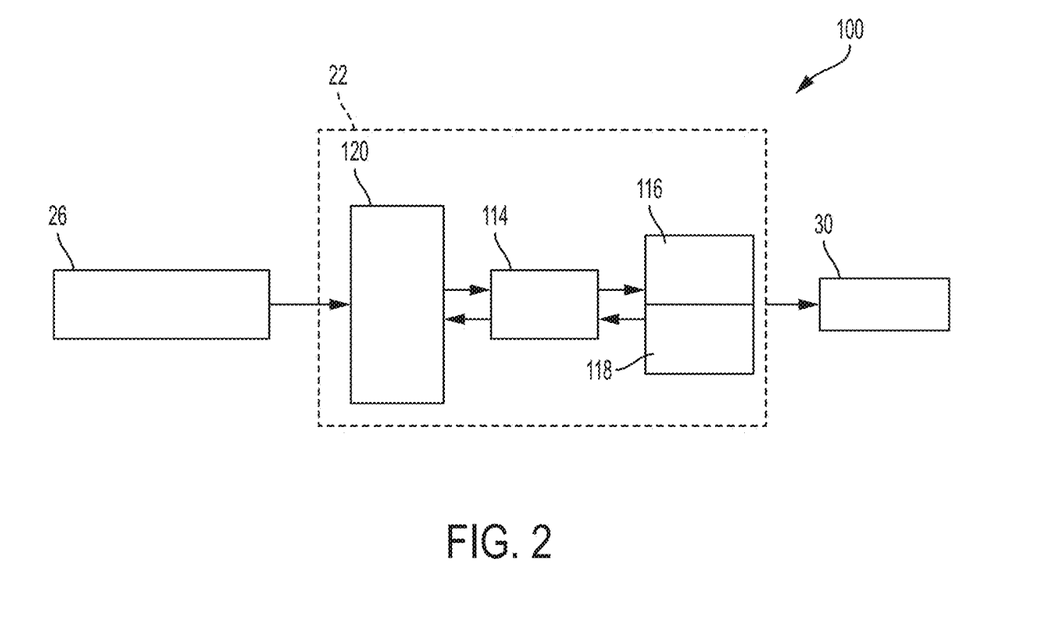
FIG. 2 is a block diagram of a system for performing a brake pad life determination, according to an embodiment.

FIG. 2 illustrates an exemplary system 100 for performing a brake life determination using wireless sensors. The processor/controller device 22 includes a central processing unit (CPU) 114 coupled to memory devices 116 and 118, which can include such memory as random access memory (RAM) 116, non-volatile read only memory (NVROM) 118, and possibly other mass storage devices. The CPU 114 is coupled through an input/output (I/O) interface 120 to at least one of the plurality of sensors 26, discussed herein with respect to FIG. 1. The sensors 26 are configured to measure various operational parameters of the vehicle such as, for example and without limitation, lateral acceleration, vehicle wheel speed, brake pad position, brake torque, and brake rotor wear, as discussed herein. In some embodiments, the CPU 114 is coupled through the I/O interface 120 to an inertial measurement unit (IMU) including one or more sensors 26. The controller 22 generates one or more control signals and transmits the control signals to the actuators 30, including, for example and without limitation, one or more actuators 30 configured to control the brake assembly 17.

The brake assembly 17 components are to be understood by those skilled in the art as exemplary mechanisms for providing vehicle braking. In some embodiments, the brake assembly 17 includes a mechanism for measuring the thickness of a brake pad and/or rotor to monitor brake pad and/or rotor wear, including, for example and without limitation, an electromechanical parking brake motor on caliper or one or more wear sensors. In various embodiments, the brake assembly 17 includes a brake pad position sensor to monitor the position of the brake pad relative to the brake rotor. The methods discussed herein may be used with any brake pad lining measurement technologies including, for example and without limitation, lining wear sensors or the electromechanical brake components discussed herein.

For brake pad thickness measurement systems that incorporate a wireless sensor, the sensor's position data needs to be filtered to check for measurement validity with regard to brake pad and/or caliper displacements due to knockback. Brake pad knockback occurs when major road inputs result in the rotor contacting the brake pads, effectively causing the brake pads to lose contact with the rotor. The position of the wireless sensor is relative to the caliper placement and current systems do not process the distance, or change in distance, between the wireless sensor and the caliper at the sensor level, resulting in calibration of the sensor position for each vehicle.

Figure 3:
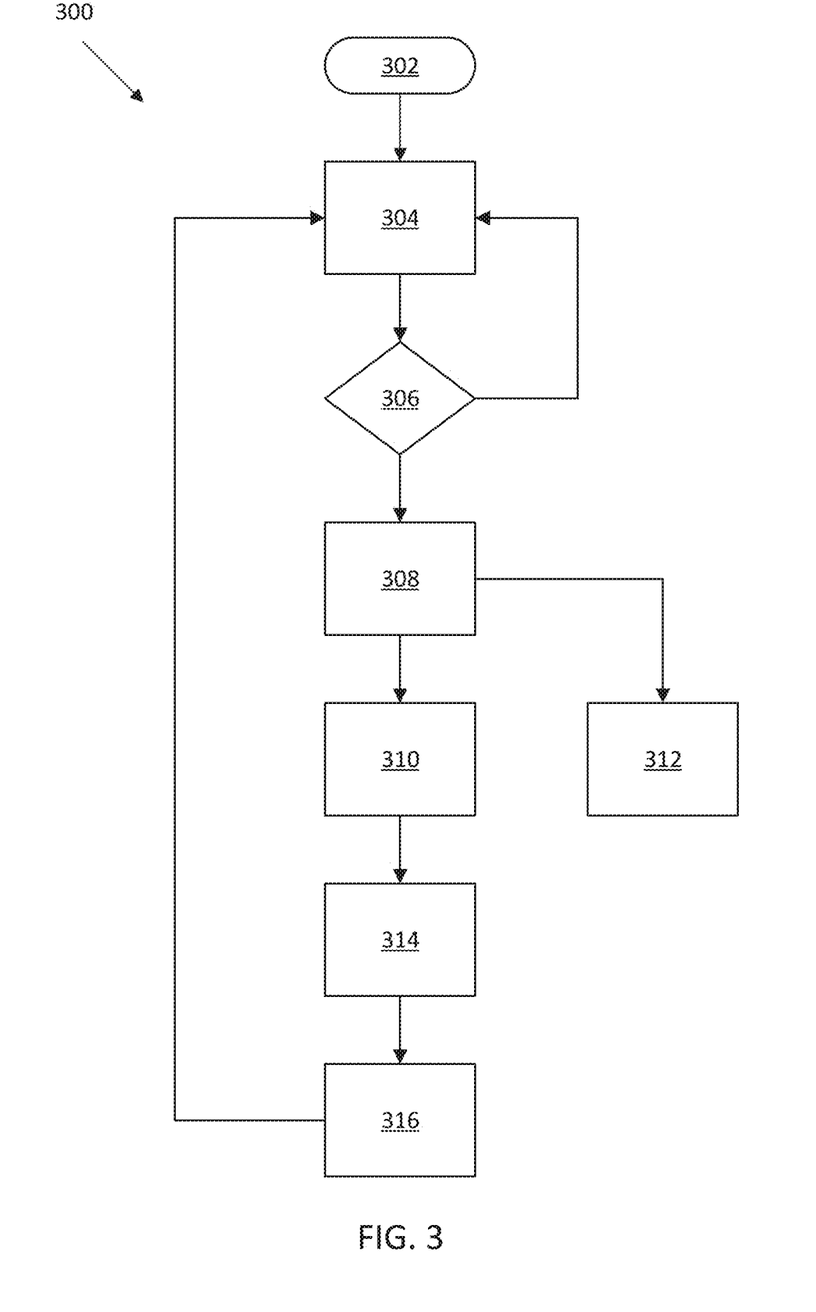
FIG. 3 is a schematic flow diagram of a method for a self-learning brake pad life determination, according to an embodiment.

FIG. 3 illustrates a method 300 to determine brake pad thickness based on data provided from a brake position wireless sensor. The method 300 performs calibration through learning, detects pad replacement, and incorporates periphery logic to detect brake knockback. The method 300 can be utilized in connection with a vehicle having a brake system and/or brake assembly, such as the vehicle 10. The method 300 can be utilized in connection with the controller 22 or vehicle electronic control unit (ECU) as discussed herein, or by other systems associated with or separate from the vehicle 10, in accordance with exemplary embodiments. The order of operation of the method 300 is not limited to the sequential execution as illustrated in FIG. 3, but may be performed in one or more varying orders, or steps may be performed simultaneously, as applicable in accordance with the present disclosure.

As shown in FIG. 3, the method 300 starts at 302 and proceeds to 304. At 304, the controller 22 receives sensor data from a wireless brake pad position sensor 26. At this step, the controller 22 also receives sensor data from the plurality of sensors 26 regarding vehicle operating conditions, such as, for example and without limitation, lateral acceleration, wheel speeds, and any rough road detection algorithms from other vehicle control systems, and analyzes this data to determine if a brake knockback condition is detected.

The method 300 then proceeds to 306. At 306, the controller 22 determines whether to initially accept or reject the sensor position data or pass the sensor data on to a brake pad replacement logic. Rejection of the sensor position data is based on whether the brake pad's backplate is determined to be close to the rotor or if the brake pad is displaced due to knockback. Upon detecting a knockback condition, sensor position data from the wireless brake pad position sensor 26 is ignored by the controller 22 until a brake apply condition is detected. In various embodiments, the brake apply condition could occur as a result of a direct application of pressure to the brake pedal by a vehicle operator or by autonomous or semi-autonomous control of the vehicle by a vehicle controller.

The initial acceptance or rejection criteria include analysis of vehicle operation characteristics determined from sensor data acquired from one or more of the sensors 26. In various embodiments, analysis of lateral acceleration data received from an IMU, and analysis of sensor data received from a wheel speed sensor 26 determine initial acceptance or rejection of the sensor position data. If the controller 22 determines that significant lateral acceleration is indicated from the sensor data and/or a rough road condition is present (determined from the wheel speed sensor data), the controller 22 determines that the brake pad's backplate is likely displaced from the rotor (that is, a knock back condition is detected), the acceptance criterion is not satisfied, and the sensor position's input data is rejected. In various embodiments, significant lateral acceleration is defined as lateral acceleration data equal to or greater than a maximum lateral acceleration threshold. In various embodiments, a rough road condition is detected from wheel speed sensor data by any method known to those skilled in the art. For example and without limitation, in various embodiments, rough road detection can be achieved by observing noisy wheel speed signals. Additionally, if the controller 22 receives sensor position data while brake pressure is applied either by the vehicle operator or via an actuator command received from a controller such as the controller 22, or the steering wheel angle is above a predefined threshold, the sensor position data is also rejected due to a displaced brake pad backplate. If the data is rejected, the method 300 returns to 304 and proceeds as discussed herein.

After initial rejection or acceptance of the sensor position data at 306, data points that are not initially rejected due to vehicle operation conditions are further analyzed by the controller 22 at 308. At 308, the controller 22 performs statistical analysis on the sensor position input data, including an initial point determination.

Figure 4:
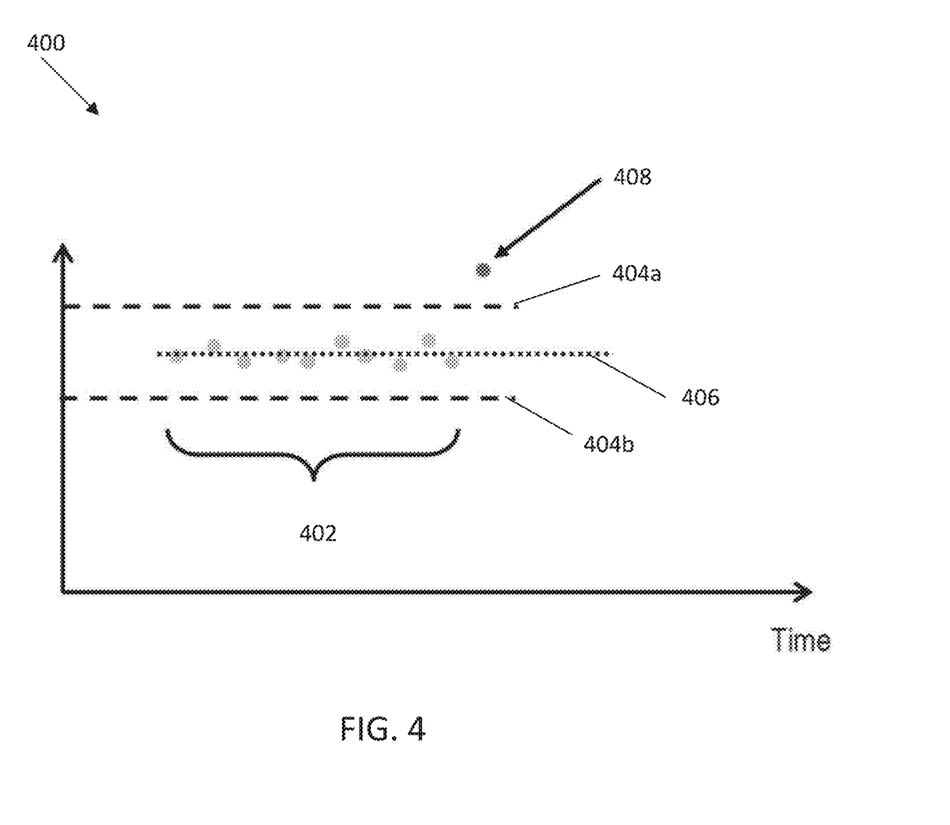
FIG. 4 is a graphical representation of a statistical analysis of sensor data used to perform a brake pad life determination, according to an embodiment.

Acceptance and rejection of the sensor position data is based on statistical analysis, as illustrated graphically 400 in FIG. 4. The last N accepted data points, indicated by 402, are evaluated by the controller 22 to determine whether to accept the sensor position data for further analysis, filter out the noisy sensor position data, or feed the sensor position data to pad replacement logic. Statistical analysis is performed on a batch of N accepted data points 402 from the position sensor. In various embodiments, the number N of data points is the number of data points since a trigger event. The trigger event is the last sensor data point for which there was a stable standard deviation. To determine the initial acceptable data point, a calibratable threshold standard deviation for the batched sensor position input data is predefined. The controller 22 analyzes the position sensor data as it is received to determine the standard deviation. Once the standard deviation is within the predefined threshold, defined as the area between an upper standard deviation limit 404a and a lower standard deviation limit 404b, shown in FIG. 4, the controller 22 stores the sensor data as part of the batched data. The controller 22 calculates the standard deviation and mean of each batch of N data points as the batched data changes with the addition of new, accepted data points.

Comparison of the sensor position input data point to the predefined standard deviation and mean of the batch data determines whether the input data point is accepted, filtered, or fed to the pad replacement logic. As additional data is accepted into the bath N of data points 402, the standard deviation threshold and the batch mean are modified as part of an incremental self-learning process.

The conditions under which the sensor position input data are accepted or filtered out are set forth below. In the equations below, $\mu_{Batch}$ is the batch mean, illustrated by line 406 in FIG. 4, having upper and lower limits indicated by lines 404a, 404b, and $\sigma_{Batch}$ is the batch standard deviation. α and β are calibratable coefficients for limits on the deviation of an input point from the batch mean. Input points are sensor position measurements.

Once a batch is established with N accepted points and upon receiving a new input point, if $|\text{Input Point} - \mu_{Batch}| \leq \alpha \sigma_{Batch}$, then the sensor position input data point is accepted due to the input data falling within acceptable noise levels. Accepted data is fed forward to step 310. At 310, the controller 22 uses the sensor position data to determine the sensor position deviation.

If |Input Point$-\mu_{Batch}$|>$\alpha\sigma_{Batch}$ and |Input Point$-\mu_{Batch}$|≤$\beta\sigma_{Batch}$, where $\alpha<\beta$, the sensor position input data point is filtered out due to higher than expected noise levels. In various embodiments, sensor position data that satisfies this condition is rejected as outside of the acceptable limits for further analysis of sensor position deviation and is not used for brake pad replacement determination.

If |Input Point$-\mu_{Batch}$|>Cal Threshold, the sensor position input data is fed to pad replacement logic, generally indicated at 312, for additional analysis. The Cal Threshold is a calibratable threshold for the deviation of the input point from the mean, $\mu_{Batch}$, of the last N points, and normally is set to a high value that represents the thickness difference between new and worn brake pads. A sensor position data point 408, shown in FIG. 4, is a data point that is both rejected for further position deviation analysis and fed to pad replacement logic based on the deviation of these data points from the previous batch's average value. At 312, the controller 22 performs calculations to determine if the position of the brake pad sensor indicates that a brake pad replacement is indicated. The brake pad replacement determination is made using any method known to those skilled in the art. For example and without limitation, a brake pad life monitoring system and method is disclosed in U.S. Pat. No. 9,316,278, issued on Apr. 19, 2016, and is incorporated by reference in its entirety herein. In another non-limiting example, methods and systems to adaptively monitor brake pad wear are disclosed in U.S. patent application Ser. No. 15/802,711, filed on Nov. 3, 2017, and is incorporated by reference in its entirety herein.

As noted above, the accepted sensor position data is used by the controller 22 for sensor position deviation calculations, generally indicated at 310. After initial operation of the vehicle after manufacture, the mean of the first accepted batch of input data points constitutes an initial reference Point, $\mu_{Reference}$, for the position of the brake pad position sensor 26. This initial reference point is automatically calculated for any vehicle setting, solving the problem of an initially-unknown sensor position and establishing an initial sensor position reference point for each individual vehicle. The sensor position deviation is a factor used to evaluate the distance between the brake pad and the rotor. The sensor position deviation data, which may be expressed as a mean deviation, is used by pad thickness determination logic, generally indicated at 314, to determine the current brake pad thickness. In various embodiments, determination of the brake pad thickness incorporates sensor data related to rotor wear.

From 314, the pad thickness determination is used by the controller 22 to determine an overall pad life estimate, generally indicated at 316. The gradual deviation of the mean of any new N batch points from $\mu_{Reference}$ indicate sensor position displacement due to brake pad wear and brake rotor wear. In some embodiments, a brake rotor wear algorithm is used to determine the rotor thickness, and the contribution of rotor wear to the displacement of the brake pad sensor position. In various embodiments, the brake rotor wear algorithm incorporates data from various vehicle sensors, including, for example and without limitation, wheel speeds sensors, brake corner pressure, outside temperature, and GPS.

From 316, the method 300 returns to 304 to evaluate any new sensor position data points and provide any updates to the pad life estimate to the vehicle operator.

It should be emphasized that many variations and modifications may be made to the herein-described embodiments the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for performing a brake pad life determination, the method comprising:
   providing a brake assembly, including a brake pad position sensor;
   providing a control system comprising a controller electronically connected to the brake assembly;
   receiving, by the controller, sensor position data from the brake pad position sensor;
   determining, by the controller, whether the sensor position data satisfies a first acceptance criterion;
   if the sensor position data satisfies the first acceptance criterion, performing, by the controller, statistical analysis of the sensor position data to determine a standard deviation and a mean of the sensor position data;
   determining, by the controller, whether the sensor position data satisfies a second acceptance criterion; and
   if the sensor position data satisfies the second acceptance criterion, determining, by the controller, a brake pad life estimate.

2. The method of claim 1, further comprising providing a vehicle sensor configured to measure a vehicle lateral acceleration, and wherein determining whether the sensor position data satisfies the first acceptance criterion comprises determining whether the vehicle lateral acceleration data is less than a maximum lateral acceleration threshold.

3. The method of claim 1, further comprising providing a vehicle sensor configured to measure a vehicle wheel speed, and wherein determining whether the sensor position data satisfies the first acceptance criterion comprises determining whether the vehicle wheel speed data is not indicative of a rough road condition.

4. The method of claim 1, wherein determining whether the sensor position data satisfies a second acceptance criterion comprises comparing an input sensor data point to the standard deviation and the mean of the sensor position data.

5. The method of claim 4, wherein comparing the input sensor data point to the standard deviation and the mean of the sensor position data comprises determining if the input sensor data point satisfies a first equation $|Input\ Point - \mu_{Batch}| \leq \alpha \sigma_{Batch}$ where $\mu_{Batch}$ is the mean of the sensor position data, $\sigma_{Batch}$ is the standard deviation of the sensor position data, and $\alpha$ is a calibratable coefficient, and if the input sensor data point satisfies the first equation, using the input sensor data point to determine a sensor position deviation.

6. The method of claim 4, wherein comparing the input sensor data point to the standard deviation and the mean of the sensor position data comprises determining if the input sensor data point satisfies a first equation $|Input\ Point - \mu_{Batch}| > \alpha \sigma_{Batch}$ and a second equation $|Input\ Point - \mu_{Batch}| \leq \beta \sigma_{Batch}$ where $\mu_{Batch}$ is the mean of the sensor position data, $\sigma_{Batch}$ is the standard deviation of the sensor position data, and $\alpha$ and $\beta$ are calibratable coefficients, and, if the input sensor data point satisfies the first and second equations, rejecting the input sensor data point.

7. The method of claim 4, wherein comparing the input sensor data point to the standard deviation and the mean of the sensor position data comprises determining if the input sensor data point satisfies a first equation $|Input\ Point - \mu_{Batch}| > Cal\ Threshold$ where $\mu_{Batch}$ is the mean of the sensor position data and Cal Threshold is a calibratable threshold for a deviation of the input point from the mean of the sensor position data, and if the input sensor data point satisfies the first equation, using the input sensor data point to determine a brake pad replacement estimate.

8. A method for performing a brake pad life determination, the method comprising:
   providing a brake assembly, including a brake pad position sensor;
   providing a vehicle sensor configured to measure a vehicle characteristic;
   providing a control system comprising a controller electronically connected to the brake assembly and the vehicle sensor;

receiving, by the controller, sensor position data from the brake pad position sensor;

determining, by the controller, whether the sensor position data satisfies a first acceptance criterion;

if the sensor position data satisfies the first acceptance criterion, performing, by the controller, statistical analysis of the sensor position data to determine a standard deviation and a mean of the sensor position data;

determining, by the controller, whether the sensor position data satisfies a second acceptance criterion; and if the sensor position data satisfies the second acceptance criterion, determining, by the controller, a brake pad life estimate.

9. The method of claim 8, wherein the vehicle sensor is a vehicle wheel speed sensor and the vehicle characteristic is a vehicle wheel speed.

10. The method of claim 9, further comprising determining a knockback condition from the vehicle wheel speed sensor data.

11. The method of claim 10, wherein if a knockback condition is indicated, rejecting the sensor position data until a second vehicle operating condition is detected.

12. The method of claim 11, wherein the second vehicle operating condition is a vehicle brake application.

13. The method of claim 9, wherein determining whether the sensor position data satisfies the first acceptance criterion comprises determining whether the vehicle wheel speed sensor data indicates a knockback condition of the brake pad position sensor and if a knockback condition is indicated, rejecting the sensor position data.

14. The method of claim 8, wherein the vehicle sensor is a lateral acceleration sensor, the vehicle characteristic is a vehicle lateral acceleration, and wherein determining whether the sensor position data satisfies the first acceptance criterion comprises determining whether vehicle lateral acceleration data is less than a maximum lateral acceleration threshold.

15. The method of claim 8, wherein determining whether the sensor position data satisfies a second acceptance criterion comprises comparing an input sensor data point to the standard deviation and the mean of the sensor position data such that if the input sensor data point satisfies a first equation $|\text{Input Point}-\mu_{Batch}| \leq \alpha\sigma_{Batch}$ where $\mu_{Batch}$ is the mean of the sensor position data, $\sigma_{Batch}$ is the standard deviation of the sensor position data, and $\alpha$ is a calibratable coefficient, the method further comprises using the input sensor data point to determine a sensor position deviation, and if the input sensor data point satisfies a second equation $|\text{Input Point}-\mu_{Batch}| > \text{Cal Threshold}$ where $\mu_{Batch}$ is the mean of the sensor position data and Cal Threshold is a calibratable threshold for a deviation of the input point from the mean of the sensor position data, the method further comprises using the input sensor data point to determine a brake pad replacement estimate.

16. A method for performing a brake pad life determination, the method comprising:

providing a brake assembly, including a brake pad position sensor;

providing a vehicle sensor configured to measure a vehicle characteristic;

providing a control system comprising a controller electronically connected to the brake assembly and the vehicle sensor;

receiving, by the controller, sensor position data from the brake pad position sensor;

determining, by the controller, whether the sensor position data satisfies a first acceptance criterion, wherein the first acceptance criterion is satisfied if a knockback condition is not detected;

if the sensor position data satisfies the first acceptance criterion, performing, by the controller, statistical analysis of the sensor position data to determine a standard deviation and a mean of the sensor position data;

comparing an input sensor data point to the standard deviation and the mean of the sensor position data to determine if the input sensor data point satisfies a first equation $|\text{Input Point}-\mu_{Batch}| \leq \alpha\sigma_{Batch}$ where $\mu_{Batch}$ is the mean of the sensor position data, $\sigma_{Batch}$ is the standard deviation of the sensor position data, and $\alpha$ is a calibratable coefficient, and if the input sensor data point satisfies the first equation, using the input sensor data point to determine a sensor position deviation;

comparing the input sensor data point to the standard deviation and the mean of the sensor position data to determine if the input sensor data point satisfies a second equation $|\text{Input Point}-\mu_{Batch}| > \alpha\sigma_{Batch}$ and a third equation $|\text{Input Point}-\mu_{Batch}| \leq \beta\sigma_{Batch}$ where $\mu_{Batch}$ is the mean of the sensor position data, $\sigma_{Batch}$ is the standard deviation of the sensor position data, and $\alpha$ and $\beta$ are calibratable coefficients, and, if the input sensor data point satisfies the second and third equations, rejecting the input sensor data point; and if the input sensor data point satisfies a fourth equation $|\text{Input Point}-\mu_{Batch}| > \text{Cal Threshold}$ where $\mu_{Batch}$ is the mean of the sensor position data and Cal Threshold is a calibratable threshold for a deviation of the input point from the mean of the sensor position data, and, if the input sensor data point satisfies the fourth equation, using the input sensor data point to determine a brake pad replacement estimate.

17. The method of claim 16, wherein the vehicle sensor is a vehicle wheel speed sensor, the vehicle characteristic is a vehicle wheel speed, and the method further comprises determining a knockback condition from vehicle wheel speed sensor data.

18. The method of claim 16, wherein the vehicle sensor is a lateral acceleration sensor, the vehicle characteristic is a vehicle lateral acceleration, and the method further comprises determining a knockback condition by determining whether vehicle lateral acceleration data is greater than a maximum lateral acceleration threshold.

* * * * *